United States Patent
Grot

(10) Patent No.: US 8,138,488 B2
(45) Date of Patent: Mar. 20, 2012

(54) SYSTEM AND METHOD FOR PERFORMING OPTICAL NAVIGATION USING SCATTERED LIGHT

(75) Inventor: Annette C. Grot, Cupertino, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 11/932,783

(22) Filed: Oct. 31, 2007

(65) Prior Publication Data
US 2009/0108175 A1   Apr. 30, 2009

(51) Int. Cl.
G01N 21/86   (2006.01)
H01L 27/00   (2006.01)

(52) U.S. Cl. .................. 250/559.29; 250/208.1

(58) Field of Classification Search .............. 250/221, 250/208.1, 559.29, 559.32, 559.04, 559.36; 345/157–167; 356/498, 337–343, 612, 614
See application file for complete search history.

(56) References Cited

U.S. PATENT DOCUMENTS

| | | | |
|---|---|---|---|
| 6,002,520 A | 12/1999 | Hoch et al. | |
| 6,618,038 B1 | 9/2003 | Bohn | |
| 7,116,427 B2 | 10/2006 | Baney et al. | |
| 7,233,025 B2* | 6/2007 | Davuluri et al. | 257/81 |
| 7,321,359 B2* | 1/2008 | Xie et al. | 345/163 |
| 2005/0024336 A1* | 2/2005 | Xie et al. | 345/166 |
| 2005/0094154 A1* | 5/2005 | Baney et al. | 356/499 |
| 2005/0168445 A1* | 8/2005 | Piot et al. | 345/163 |
| 2005/0231482 A1 | 10/2005 | Theytaz et al. | |
| 2006/0202975 A1 | 9/2006 | Chiang | |
| 2007/0008286 A1 | 1/2007 | Theytaz et al. | |
| 2007/0013661 A1 | 1/2007 | Theytaz et al. | |
| 2007/0139659 A1* | 6/2007 | Hwang et al. | 356/614 |
| 2007/0291001 A1* | 12/2007 | Trisnadi et al. | 345/166 |
| 2007/0296699 A1* | 12/2007 | Bohn et al. | 345/166 |
| 2008/0185508 A1* | 8/2008 | Cheng et al. | 250/239 |

OTHER PUBLICATIONS

John C. Stover, Optical Scattering, SPIE—The International Society for Engineering 1995, pp. 111-120 (Chapter 5).

* cited by examiner

Primary Examiner — Que T Le
Assistant Examiner — Pascal M Bui Pho

(57) ABSTRACT

A system and method for performing optical navigation uses scattered light to produce frames of image data to estimate displacement with respect to a target surface. The scattered light is produced from an illumination beam of light emitted along a first optical axis onto the target surface. The illumination beam of light also produces a specularly reflected beam of light along a second optical axis. The scattered light about a third optical axis, which is offset by a predefined angle with respect to the second optical axis, is received at an image sensor array to produce the frames of image.

25 Claims, 6 Drawing Sheets

SYSTEM AND METHOD FOR PERFORMING OPTICAL NAVIGATION USING SCATTERED LIGHT

BACKGROUND OF THE INVENTION

Optical navigation systems detect relative movements between the optical navigation systems and target or navigation surfaces to perform tracking operations. An optical navigation system uses a light source, such as a light-emitting diode or a laser diode, to provide illumination light on a navigation surface and an image sensor to successively capture frames of image data in response to the illumination light reflected off the navigation surface. The optical navigation system compares the successive frames of image data and estimates the relative movements between the optical navigation system and the navigation surface based on the comparison between the current frame of image data and a previous frame of image data. The optical navigation system is able to track the relative movements between the optical navigation system and the navigation surface by continuously capturing and comparing frames of image data.

Optical navigation systems are commonly used in optical computer mice to track the lateral movements of the mice relative to the navigation surfaces on which the mice are manually manipulated. An optical computer mouse typically requires a minimum volume in order for the optical navigation system in the optical computer mouse to generate high contrast images with a large field of view (i.e., a region on the navigation surface captured by the image sensor). Image contrast is important for an optical navigation system since the noise in the system will otherwise dominate, which makes it difficult to accurately determine the displacement of the optical computer mouse relative to the navigation surface. Field of view is also important for an optical navigation system to capture large frames of image data in order to measure high velocity movements (e.g., 20 to 30 inches per second).

While some navigation surfaces readily produce high contrast frames of image data, other navigation surfaces such as surfaces of glass tables, i.e., surfaces of sheets of glass on tabletops or glass tables with no structure directly under the field of view, do not when probed by conventional optical mice. Furthermore, the field of view usually scales with the focal length of the optical navigation system, and consequently, the height of the system. Thus, it is desirable to have an optical navigation system that can produce frames of image data with high contrast and a large field of view for a wide variety of surfaces, including glass tables, in a small a volume as possible.

SUMMARY OF THE INVENTION

A system and method for performing optical navigation uses light scattered from the navigation surface to produce frames of image data to estimate displacement with respect to a target surface. The scattered light is produced from an illumination beam of light emitted along a first optical axis onto the target surface. The illumination beam of light also produces a specular reflected beam of light along a second optical axis. The scattered light about a third optical axis, which is offset by a predefined angle with respect to the second optical axis, is received at an image sensor array to produce the frames of image. The configuration of the system allows the volume of the system to be minimized while maintaining a large field of view and producing high contrast frames of image data over a wide variety of navigation surfaces, even surfaces of glass tables, i.e., surfaces of sheets of glass on tabletops with or without support directly below the field of view.

A system for performing optical navigation in accordance with an embodiment of the invention includes a light source, an image sensor array and a processor. The light source is positioned to emit an illumination beam of light along a first optical axis onto a target surface at a nonzero angle of incidence with respect to the normal to the target surface to produce a specularly reflected beam of light along a second optical axis and scattered light. The image sensor array is positioned to receive the scattered light about a third optical axis, which is offset by a predefined angle from the second optical axis of the specularly reflected beam of light. The third optical axis is positioned at a nonzero angle with respect to the normal to the target surface. The image sensor array is configured to produce frames of image data from the received scattered light. The processor is operably connected to the image sensor array to receive and correlate the frames of image data to estimate displacement with respect to the target surface.

A system for performing optical navigation in accordance with another embodiment of the invention includes a light source, an image sensor with an array of photosensitive elements, collection optics and a processor. The light source is positioned to emit an illumination beam of light along a first optical axis onto a target surface at a nonzero angle of incidence with respect to the normal to the target surface to produce a specularly reflected beam of light along a second optical axis and scattered light. The image sensor is positioned to receive the scattered light about a third optical axis at the array of photosensitive elements. The third optical axis is offset by a predefined angle from the second optical axis of the specularly reflected beam of light. The third optical axis is positioned at a nonzero angle with respect to the normal to the target surface. The image sensor is configured to produce frames of image data from the received scattered light. The collection optics is positioned between the target surface and the image sensor to optically manipulate the scattered light about the third optical axis onto the array of photosensitive elements. The processor is operably connected to the image sensor to receive and correlate the frames of image data to estimate displacement with respect to the target surface.

A method for performing optical navigation in accordance with an embodiment of the invention comprises emitting an illumination beam of light along a first optical axis onto a target surface at a nonzero angle of incidence with respect to the normal to the target surface to produce a specularly reflected beam of light along a second optical axis and scattered light, receiving the scattered light about the third optical axis at an image sensor array, the third optical axis being offset by a predefined angle from the second optical axis of the specularly reflected beam of light, the third optical axis being positioned at a nonzero angle with respect to the normal to the target surface, and accumulating electrical signals at the image sensor array to produce frames of image data in response to the received scattered light to estimate displacement with respect to the target surface.

Other aspects and advantages of the present invention will become apparent from the following detailed description, taken in conjunction with the accompanying drawings, illustrated by way of example of the principles of the invention.

DETAILED DESCRIPTION

Figure 1:
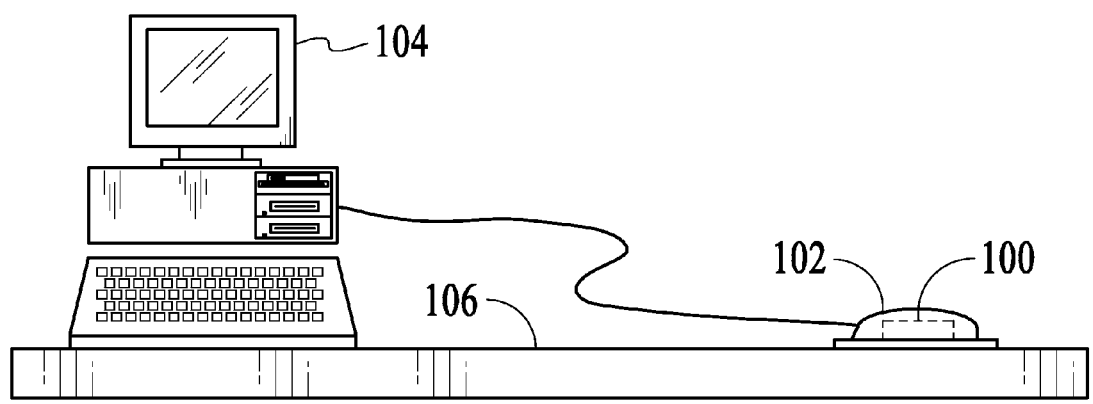
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In other embodiments, the optical computer mouse 102 may be wirelessly connected to the computer 104. In this implementation, the optical navigation system 100 is used to optically track the movements of the optical mouse 102 as the optical mouse is manipulated over a navigation or target surface 106 by a user to control a cursor displayed on the computer 104. However, in other implementations, the optical navigation system 100 can be used in different products for various tracking applications. As described in detail below, the optical navigation system 100 is designed such that that the volume of the system is minimized while maintaining a large field of view and producing high contrast frames of image data over a wide variety of navigation surfaces, even surfaces of glass tables, i.e., surfaces of sheets of glass on tabletops.

Figure 2:
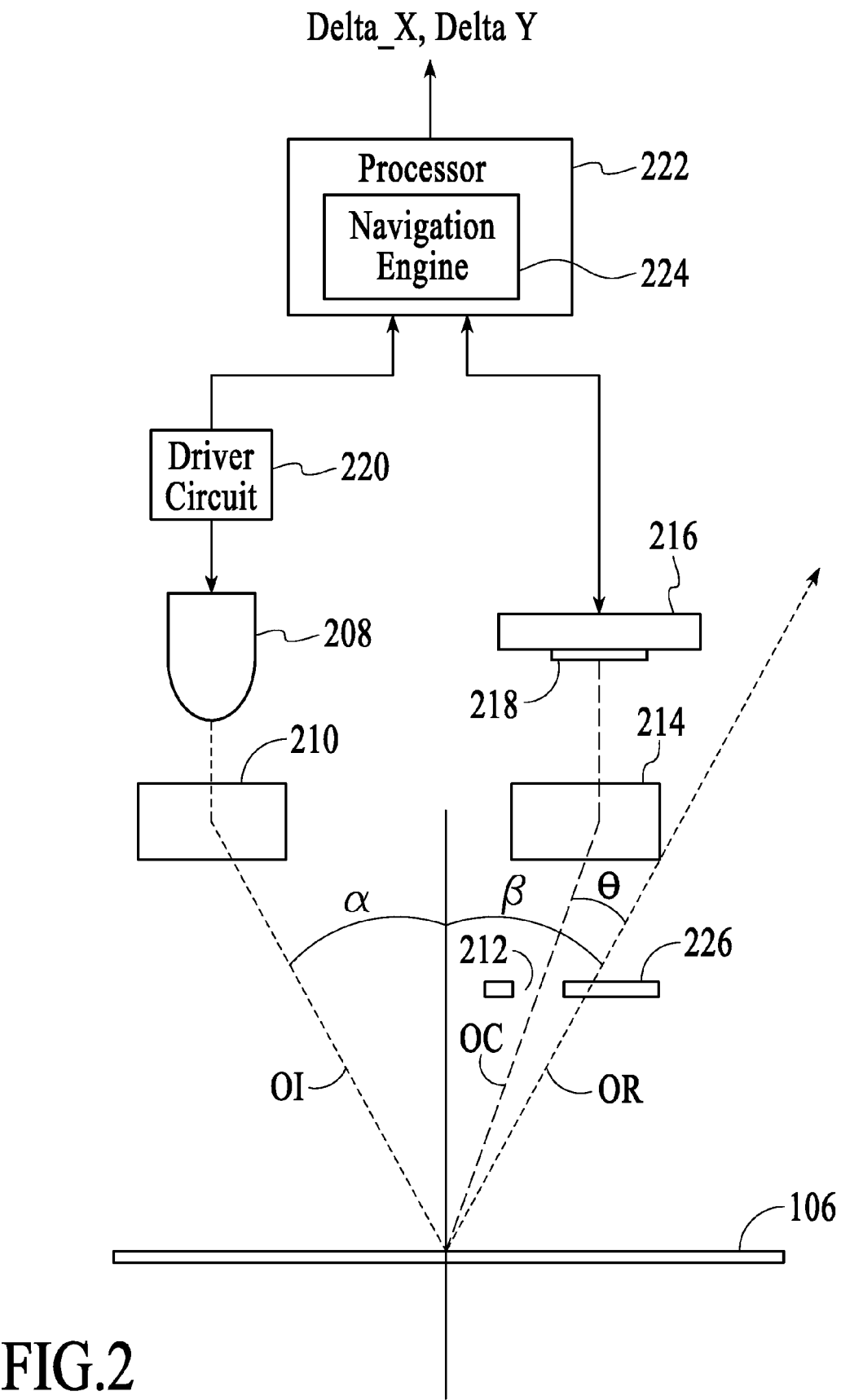
FIG. 2 is a block diagram of the optical navigation system included in the optical mouse of FIG. 1 in accordance with an embodiment of the invention.

As shown in FIG. 2, the optical navigation system 100 in accordance with an embodiment of invention includes a light source 208, illumination optics 210, an aperture 212, collection optics 214, an image sensor 216 with an array 218 of photosensitive elements (hereinafter "image sensor array"), a driver circuit 220 and a processor 222 with a navigation engine 224. Although these components of the optical navigation system 100 are shown in FIG. 2 as being separate components, some of these components may be integrated. As an example, the image sensor 216, the driver circuit 220 and the processor 222 with the navigation engine 224 may be integrated into a single integrated circuit chip.

The light source 208 is configured to emit an illumination beam of light in response to an applied driving signal. The light source 208 can be any type of a light emitting device, such as a light-emitting diode (LED) or a laser diode. As an example, the light source 208 may be a vertical-cavity surface-emitting laser (VCSEL), which generates coherent laser beam of light. The light source 208 is activated by the driver circuit 220, which provides driving signals to the light source. The illumination optics 210 is positioned between the light source 208 and the target surface 106. In an embodiment, the illumination optics 210 is an illumination lens that is configured to substantially collimate the illumination beam of light from the light source 208 onto a region of the navigation surface 106 to illuminate that region of the navigation surface. The illumination optics 210 may be configured so that the diameter of the incident beam of light at the navigation surface 106 is relatively small, e.g., approximately 1 mm in diameter.

In an embodiment, the light source 208 and the illumination optics 210 are configured and positioned so that the angle of incidence of the illumination beam of light at the navigation surface 106 is $\alpha$, which is greater than zero with respect to the normal N to the navigation surface. As an example, the angle $\alpha$ can be any angle from five (5) to eighty (80) degrees. In some implementations, the angle $\alpha$ is greater thirty (30) degrees. In a particular implementation, the angle $\alpha$ is approximately thirty-six (36) degrees. The optical axis of the illumination beam of light after passing through the illumination optics 210 and before striking the navigation surface 106 is indicated in FIG. 2 as "OI". Thus, in this embodiment, the light source 208 and the illumination optics 210 are configured and positioned to emit the illumination beam of light along the optical axis OI.

Figure 3:
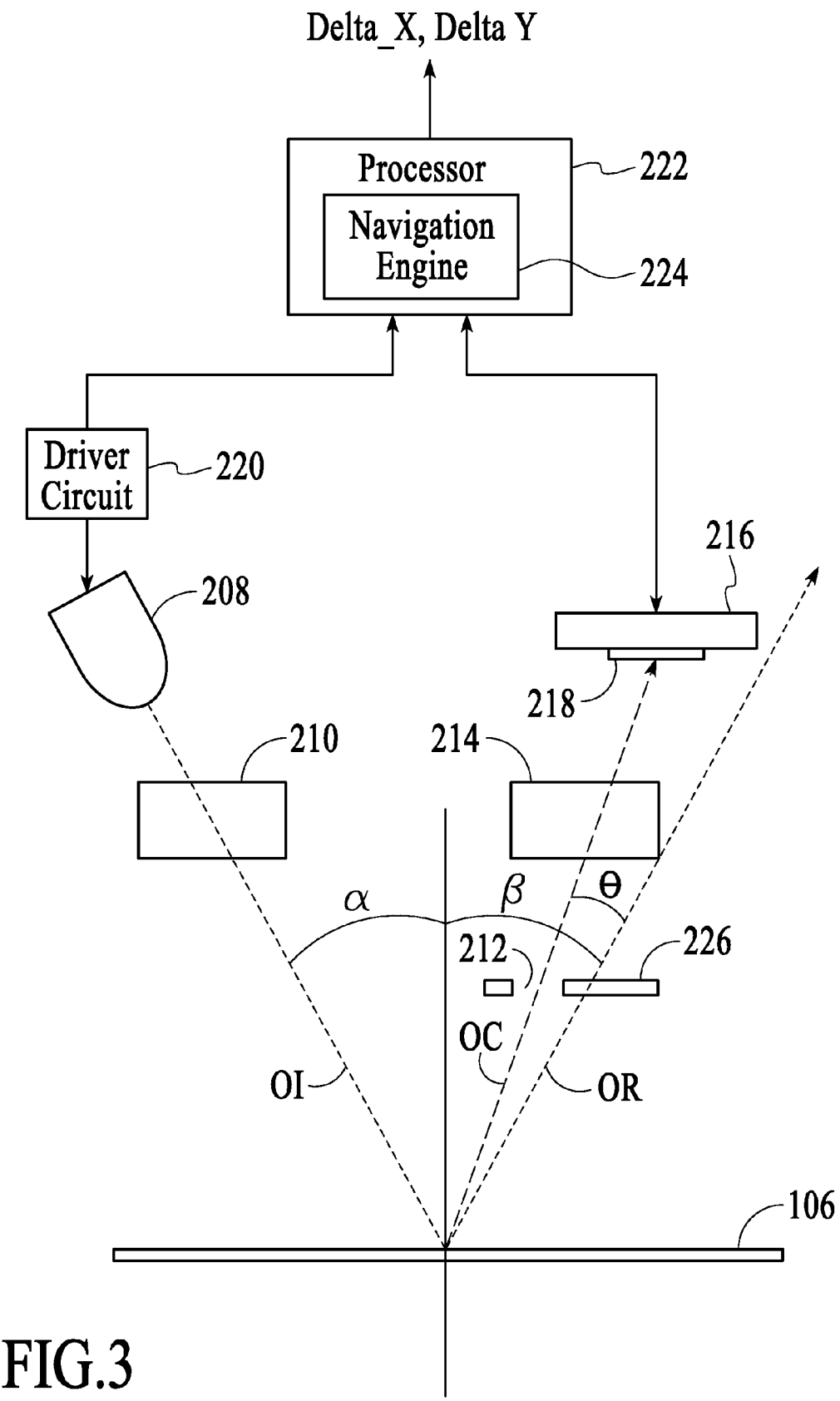
FIG. 3 is a block diagram of an optical navigation system in accordance with another embodiment of the invention.

In FIG. 2, the light source 208 is positioned such that the beam of light from the light source initially travels along an optical path that is not aligned with the optical axis OI. However, in other embodiments, the light source 208 may be positioned such that the beam of light from the light source does initially travel along an optical path that is substantially aligned with the optical axis OI, as illustrated in FIG. 3. As used herein, the term "substantially" or "approximately" with respect to a defined angle or direction includes small deviations (e.g., within plus or minus two degree) from defined angle or direction.

As shown in FIG. 2, the illumination beam of light is reflected from the navigation surface 106 as a specularly reflected beam of light. The angle of reflection of the specularly reflected beam of light is $\beta$, which is also greater than zero with respect to the normal N to the navigation surface and equal to the angle of incidence, $\alpha$. The optical axis of the specularly reflected beam of light after reflecting from the navigation surface 106 is indicated in FIG. 2 as "OR". In addition to the specularly reflected beam of light, perturbations on the navigation surface 106 cause some of the incident light to be scattered. For small, thin perturbations, this scattered light is typically weak and concentrated at angles near the specularly reflected beam of light (See chapter 5 of *Optical Scattering* by John Stover, SPIE-The International Society for Engineering 1995, which is incorporated herein by reference).

The collection optics 214 is positioned between the navigation surface 106 and the image sensor 216 to receive and direct the scattered light from the navigation surface onto the image senor array 218 of the image sensor 216. In order to produce high contrast frames of image data for optical navigation even if the navigation surface 106 is relatively smooth, it is desirable to place the collection optics 214 where there is greatest amount of scattered light. For small (on the order of the wavelength of the illumination source) sparsely distributed perturbations, the scattering intensity is greatest for small angles close to the optical axis OR. Thus, the collection optics 214 should be placed close to the optical axis OR, or the light source 208 and the illumination optics 210 should be configured and positioned so that the optical axis OR is close to the collection optics 214. As an example, the collection optics 214 is positioned relative to the optical axis OR so that scattered light about a collection optical axis OC is received by the collection optics and directed towards the image sensor array 218. As used herein, "scattered light about an optical axis" means scattered light within a solid angle of less than 0.4 steradians. The optical axis OC is offset with respect to the optical axis OR by an angle of $\theta$, and thus, the angle $\theta$ is the angle between the optical axis OR and the optical axis OC. The optical axis OC is positioned at a non-zero angle with respect to the normal to the navigation surface 106. As an example, the angle θ may be approximately five (5) to twenty-five (25) degrees. In a particular implementation where the angle α is equal to approximately thirty-six (36) degrees, the angle θ is approximately fourteen (14) degrees. In this particular implementation, the optical axis OC may be positioned at a nonzero angle of twenty-two (22) degrees from the navigation surface normal.

However, allowing a substantial portion of the specularly reflected beam of light to strike the image sensor array 218 may decrease the contrast of frames of image data or produce frames of image data that are uncorrelated to movements of the optical navigation system 100 with respect to the navigation surface 106. Thus, for optimal performance, the collection optics 214 is designed and/or positioned to direct only the scattered light towards the image sensor array 218 and to direct the specularly reflected light away from the image sensor array. In some embodiments, the collection optics 214 is positioned so that most or all of the specularly reflected light does not strike the collection optics.

In an embodiment, the collection optics 214 is a refractive or diffractive imaging lens that forms a well-focused image of the navigation surface 106 on the image sensor array 218. The specifics of such imaging lens design are known to those skilled in the art, and thus, are not described herein. The collection optics 214 may magnify or de-magnify the image of the navigation surface 106 in order to achieve the proper field of view with the size of the image sensor array 218. In some embodiments, the angle of incidence of the illumination beam of light from the light source 208 and the polarization of the illumination beam of light are chosen so that the reflection coefficient of the specular reflection for common dielectric surfaces is significantly reduced (Brewster angle) to reduce the amount of specularly reflected light that may be transmitted to the image sensor array 218.

Although the collection optics 214 is illustrated in FIG. 2 as being positioned at angles with respect to the surface normal axis less than the optical axis OR, the collection optics may be positioned at angles with respect to the surface normal axis greater than the optical axis OR. In fact, the collection optics 214 may be positioned anywhere annularly about the optical axis OR so that the scattered light from the navigation surface 106 about the optical axis OC is received by the collection optics and directed towards the image sensor array 218. Furthermore, in some embodiments, the illumination optics 210 and the collection optics 214 may be integrated into a single optical element formed using an appropriate transparent material.

In FIG. 2, the collection optics 214 is configured to direct the collected scattered light towards the image sensor array 218 of the image sensor 216 along a direction that is not aligned with the optical axis OC. In the illustrated embodiment, the collection optics 214 is configured such that the angle of incidence at the light-receiving surface of the image sensor array 218 with respect to the normal to the light-receiving surface of the image sensor array is reduced. However, in other embodiments, the collection optics 214 may be configured to direct the collected scattered light towards the image sensor array 218 of the image sensor 216 along a direction that is aligned with the optical axis OC, as illustrated in FIG. 3.

By positioning the collection optics 214 along the optical axis OC, which is not normal to the navigation surface 106, the height of the navigation system 100 is reduced for the same optical path length by cosine of the angle between the optical axis OC and the axis normal to the navigation surface 106. Furthermore, due to the tilt of the optical axis OC, the angle of incidence a of the illumination beam of light can be increased, which has the following advantages:

the light source 108 and the illumination optics 210 can be placed further away from the collection optics 214 to reduce optical noise at the image sensor array 218;

the intensity of the reflected beam of light is increased (Fresnel reflection coefficient); and a separate lift detection mechanism is not needed because only the surface near the mouse is in the field of view of the image sensor array 218.

Figure 4:
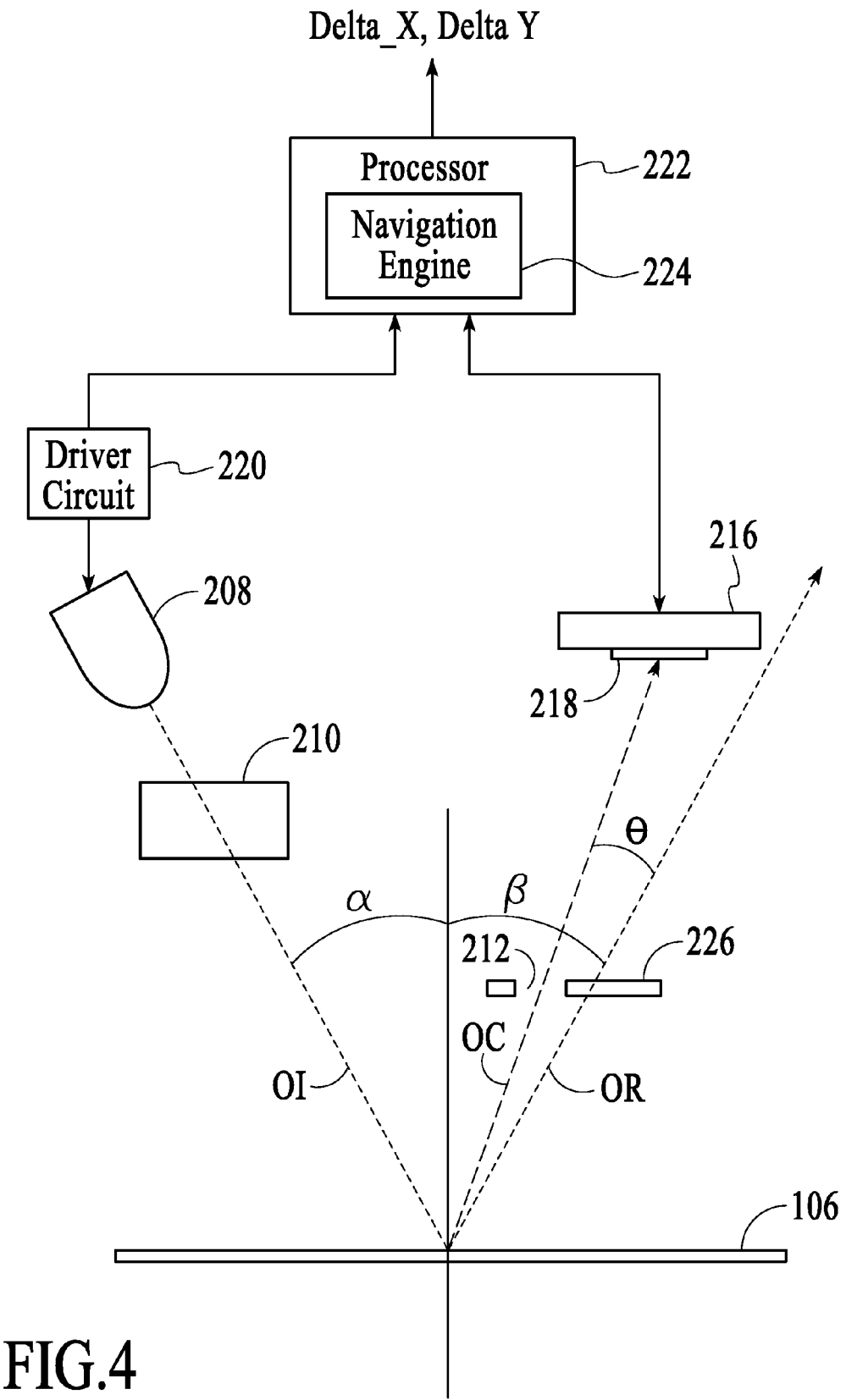
FIG. 4 is a block diagram of an optical navigation system in accordance with another embodiment of the invention.

In some embodiments, the optical navigation system 100 may not include the collection optics 214. In such embodiments, the image sensor 216 is positioned such that the center of the image sensor array 218 is aligned with the optical axis OC to directly receive the scattered light from the navigation surface 106, as illustrated in FIG. 4. Thus, the image sensor array 218 is positioned along the optical axis OC. In some of these embodiments, the image sensor 216 may be positioned so that most or all of the specularly reflected beam of light does not strike the image sensor array 218.

The aperture 212 is used to transmit the scattered light from the navigation surface 106 about the optical axis OC towards the image sensor array 218 and to block unwanted light, such as the specularly reflected light. The aperture 212 may be provided by a hole in an opaque wall or plate 226, which may be structural part of the optical navigation system 100 or the optical mouse 102. In the illustrated embodiments, the aperture 212 is positioned along the optical axis OC between the navigation surface 106 and the collection optics 214. However, in other embodiments, the aperture 212 may be positioned between the collection optics 214 and the image sensor array 218. The aperture 212 does not need to be rotationally symmetric. In some cases, the aperture 212 may be designed to be shorter in one direction to block some of the specularly reflected light and wider in another direction so as to collect light from asymmetric features of the surface.

The image sensor 216 is positioned to receive the scattered light from the collection optics 214 at the image sensor array 218. In some embodiments, the image sensor 216 is positioned such that the center of the image sensor array 218 is aligned with the optical axis OC, as illustrated in FIG. 3. However, in other embodiments, the image sensor 216 may be positioned such that the center of the image sensor array 218 is not aligned with the optical axis OC, as illustrated in FIG. 2. The image sensor array 218 includes photosensitive pixel elements (not shown) that generate signals in response to light incident on the elements, where each signal represents the amount or intensity of light incident on a particular element of the image sensor array. These signals in digital form are referred to herein as image data. Thus, the image sensor array 218 is able to sequentially capture frames of image data in response to incident light, i.e., the scattered light about the optical axis OC from the navigation surface 106. These frames of image data are used for correlation to estimate any relative lateral displacement between the optical navigation system 100 and the navigation surface 106. As an example, the image sensor array 218 may be a charge-coupled device (CCD) image sensor array or a complementary metal oxide semiconductor (CMOS) image sensor array. The number of photosensitive pixel elements included in the image sensor array 218 may be chosen such that the field of view and resolution of the array are sufficient to accurately measure displacement at high velocity. As an example, the image sensor array 218 may be a 30×30 array of photosensitive pixel elements, where each pixel element measures 50 μm×50 μm.

The image sensor 216 also includes circuitry, such as an analog-to-digital converter, row and column decoders and an electronic shutter control, to support the image sensor array 218.

The processor 222 is configured to control the driver circuit 220 and the image sensor 216 in order to provide the illumination beam of light on the navigation surface 106 and to capture frames of image data in response to the scattered light from the navigation surface. The processor 222 is electrically connected to the driver circuit 220 and the image sensor 216 to provide control signals. The processor 222 provides control signals to the driver circuit 220 to direct the driver circuit to apply driving signals to the light source 208 to activate the light source. The processor 222 also provides control signals to the image sensor 216 to control the accumulation of electrical signals or charges at the photosensitive pixel elements of the image sensor array 218 to produce each frame of image data for correlation.

In the illustrated embodiment, the processor 222 includes the navigation engine 224, which is programmed into the processor. However, in other embodiments, the navigation engine 224 may be a separate component. Thus, the navigation engine 224 can be implemented as software, hardware and/or firmware. The navigation engine 224 operates to correlate the frames of image data captured at different times by the image sensor 216 to estimate any lateral displacement changes between the optical navigation system 100 and the navigation surface 106 with respect to X and Y directions, which are parallel to the navigation surface 106. The process of correlating frames of image data for displacement estimation or navigation is well known, and thus, is not described herein. In an embodiment, the output of the navigation engine 224 includes directional delta X displacement values and directional delta Y displacement values. Each directional displacement value includes a negative or positive sign information, which indicates direction, and an absolute displacement value, which indicates the amount of displacement in that direction. In a particular implementation, the directional delta X and Y displacement values are generated in the form of hex numbers. The navigation engine 224 may also be configured to calculate other properties of the interaction between the optical navigation system 100 and the navigation surface 106, such as whether the optical navigation system has been lifted off the navigation surface.

In some embodiments, the light source 208 may be an incoherent light source such as an LED and the illumination optics 210 may be a diffractive optical element to provide illumination on the navigation surface 106 with uniform radial angles about the optical axis OC. Such a diffractive optical element is described in U.S. Pat. No. 6,002,520, which is incorporated herein by reference. This diffractive optical element comprises two surfaces. One surface divides the incident beam into an annular ring of beamlets. The second element directs those beamlets to the field of view on the navigation surface. In contrast, using a single laser and a diffractive optical element may cause interference at the illumination spot on the navigation surface 106, which can cause the intensity of light received at the image sensor array 218 to vary considerably.

Figure 5A:
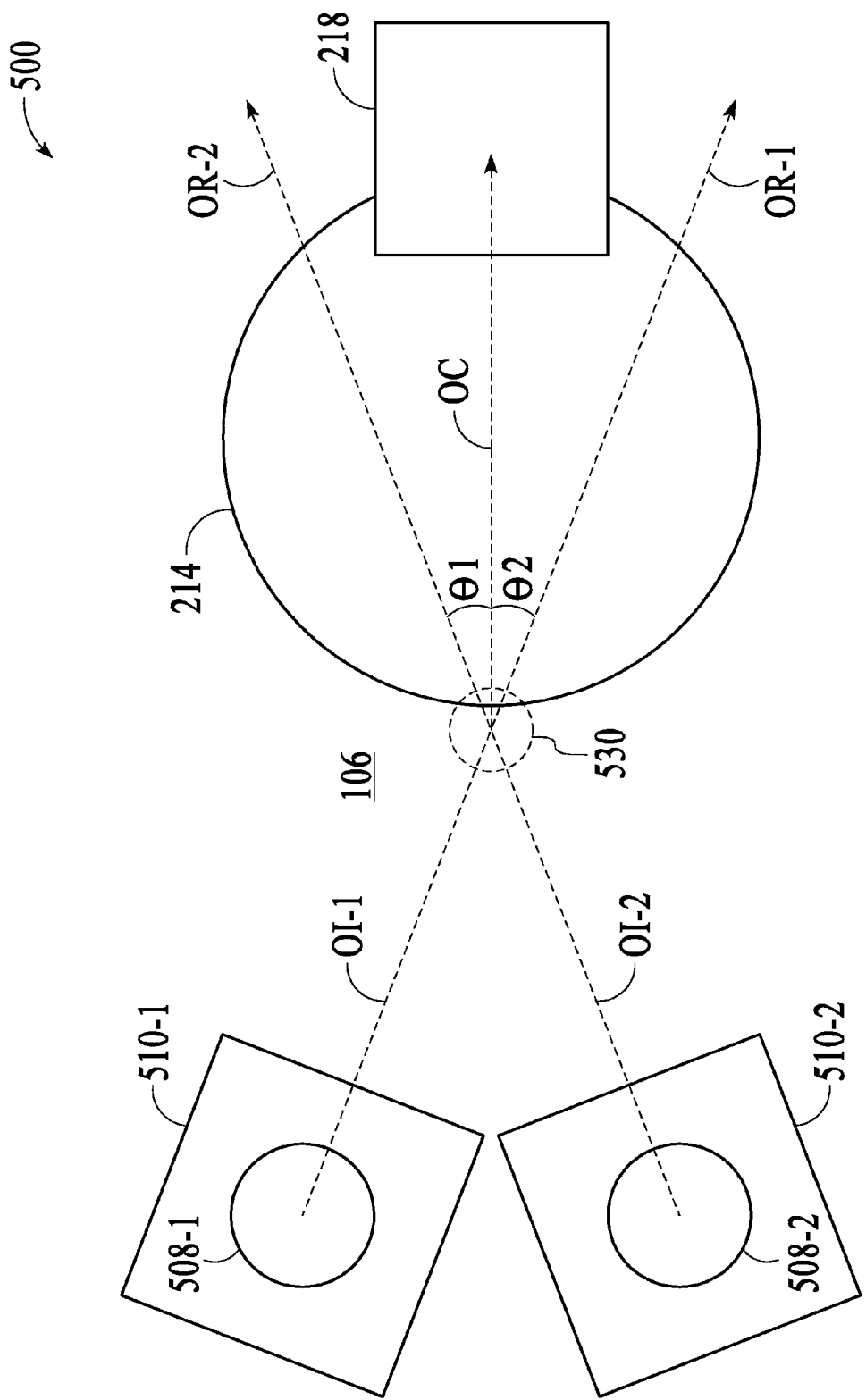
FIG. 5A is a top view of an optical navigation system in accordance with another embodiment of the invention.

Furthermore, in some embodiments, the optical navigation system 100 may include multiple light sources to provide multiple illumination beams of light. Turning now to FIG. 5A, an optical navigation system 500 with two light sources 508-1 and 508-2 in accordance with an embodiment of the invention is shown. The same reference numbers used in FIGS. 2-4 will be used to indicate similar elements in FIG. 5A, which is a top view of the optical navigation system 500.

In FIG. 5, the aperture 212, the driver circuit 220 and the processor 222 with the navigation engine 224 are not shown. Furthermore, only the image sensor array 218 is shown rather than the image sensor 216.

As shown in FIG. 5A, the optical navigation system 500 includes illumination optics 510-1 and 510-2 for the light sources 508-1 and 508-2, respectively. The light sources 508-1 and 508-2 and the illumination optics 510-1 and 510-2 are configured and positioned so that the illumination beams of light from the light sources strike the navigation surface 106 at a common region 530. As shown in FIG. 5A, the illumination beam of light from the light source 508-1 travels along an optical axis OI-1 before striking the navigation surface 106 at the region 530. The specular reflection of the illumination beam of light from the light source 508-1 off the navigation surface 106 travels along an optical axis OR-1 1, which misses the image sensor array 218. Similarly, the illumination beam of light from the light source 508-2 travels along an optical axis OI-2 before striking the navigation surface 106 at the region 530. The specular reflection of the illumination beam of light from the light source 508-2 off the navigation surface 106 travels along an optical axis OR-2, which also misses the image sensor array 218. However, the scattered light of the illumination beams of light from the light sources 508-1 and 508-2 travels at least partially along an optical axis OC and strikes the image sensor array 218. The optical axis OR-I is offset with respect to the optical axis OC by an angle of θ1, while the optical axis OR-2 is offset with respect to the optical axis OC by an angle of θ2, where θ1 may or may not equal θ2.

Figure 5B:
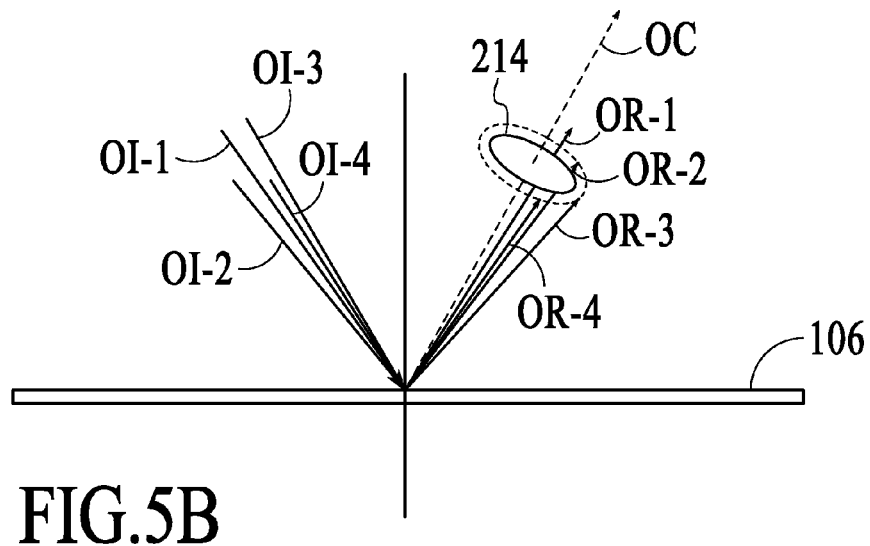
FIG. 5B shows optical axes of specularly reflected beams of light about a collection optical axis for multiple illumination beams of light in accordance with an embodiment of the invention.

As illustrated in FIG. 5B, for an arbitrary number of illumination beams, N, along the respective illumination optical axes, OI-N, the reflection optical axes, OR-N, of the specularly reflected beams are specified to circumscribe the optical axis OC and aperture 212 so that scattering from different radial directions can be collected. As described above with respect to FIG. 2, the optical path of the scattered light about the desired optical axis, i.e., the optical axis OC, to the image sensor array 218 may be changed by the collection optics 214.

Figure 6:
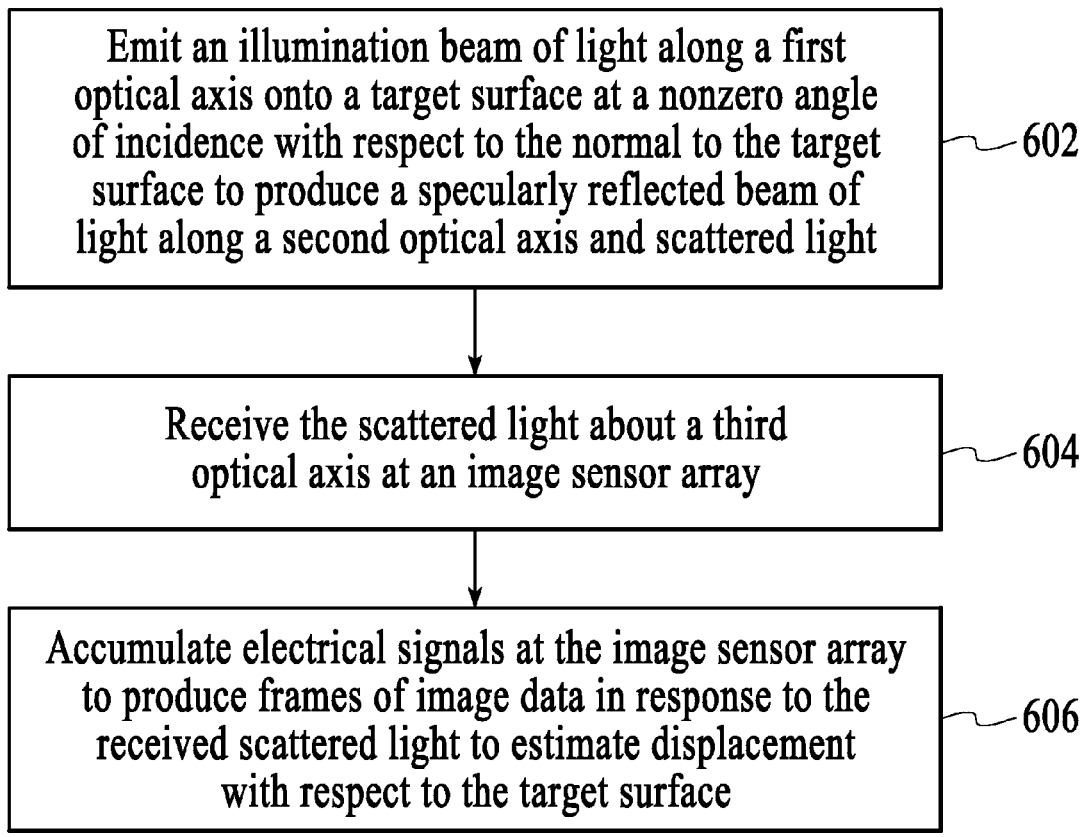
FIG. 6 is a flow diagram of a method for performing optical navigation in accordance with an embodiment of the invention.

A method for performing optical navigation in accordance with an embodiment of the invention is described with reference to a process flow diagram of FIG. 6. At block 602, an illumination beam of light is emitted along a first optical axis onto a target surface at a nonzero angle of incidence with respect to the normal to the target surface to produce a specularly reflected beam of light along a second optical axis and scattered light. At block 604, the scattered light about the third optical axis is received at an image sensor array. The third optical axis is offset by a predefined angle from the second optical axis of the specularly reflected beam of light. The third optical axis is positioned at a nonzero angle with respect to the normal to the target surface. At block 606, electrical signals are accumulated at the image sensor array to produce frames of image data in response to the received scattered light to estimate displacement with respect to the target surface.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for performing optical navigation, the system comprising;
    a light source positioned to emit an illumination beam of light along a first optical axis onto a target surface at a nonzero angle of incidence with respect to the normal to the target surface to produce a specularly reflected beam of light along a second optical axis from the target surface and to produce scattered light along a third optical axis from the target surface;

an image sensor array positioned to receive the scattered light from the target surface about the third optical axis, the third optical axis being offset by a predefined angle from the second optical axis of the specularly reflected beam of light, the third optical axis being positioned at a nonzero angle with respect to the normal to the target surface, the image sensor array being further positioned such that most or all of the specularly reflected beam of light does not strike the image sensor array, the image sensor array being configured to produce frames of image data from the received scattered light, the image sensor array being positioned to receive the scattered light about the third optical axis, where the third optical axis is offset by the predefined angle of five to twenty-five degrees from the second optical axis; and a processor operably connected to the image sensor array to receive and correlate the frames of image data to estimate displacement with respect to the target surface when the target surface is a glass-like surface with small perturbations that produces the scattered light at angles near the third optical axis.

2. The system of claim 1 wherein the light source is positioned to emit the illumination beam of light along the first optical axis onto the target surface at the nonzero angle of incidence that is greater than thirty degrees.

3. The system of claim 1 further comprising illumination optics positioned between the target surface and the light source to receive the illumination beam of light from the light source and direct the illumination beam of light onto the target surface along the first optical axis.

4. The system of claim 3 wherein the light source is an incoherent light source and the illumination optics include a diffractive optical element to provide illumination on the target surface with uniform radial angles about the third optical axis.

5. The system of claim 1 wherein the image sensor array is positioned along the third optical axis.

6. The system of claim 1 further comprising collection optics positioned along the third optical axis to direct the scattered light about the third optical axis to the image sensor array and to direct the specularly reflected beam of light away from the image sensor array.

7. The system of claim 6 wherein the collection optics includes an imaging lens configured to direct the scattered light about the third optical axis to the image sensor array.

8. The system of claim 1 further comprising at least one aperture positioned along the third optical axis between the target surface and the collection optics or between the collection optics and the image sensor array to transmit the scattered light about the third optical axis, the at least one aperture being positioned and configured to block at least some of the specularly reflected beam of light.

9. The system of claim 1 further comprising multiple light sources positioned to emit illumination beams of light along different illumination optical axes onto the target surface so that scattered light from each of the illumination beams of light about the third optical axis is received at the image sensor array.

10. The system of claim 9 wherein the multiple light sources are positioned such that the illumination beams of light strike a common region on the target surface and such that optical axes of specularly reflected beams of light due to the illumination beams of light circumscribe the third optical axis.

11. The system of claim 1 wherein the light source is positioned to emit the illumination beam of light along the first optical axis onto the target surface at the nonzero angle of incidence of approximately thirty-six degrees and wherein the third optical axis is offset by the predefined angle of approximately fourteen degrees from the second optical axis.

12. A system for performing optical navigation, the system comprising;

a light source positioned to emit an illumination beam of light along a first optical axis onto a target surface at a nonzero angle of incidence with respect to the normal to the target surface to produce a specularly reflected beam of light along a second optical axis from the target surface and to produce scattered light along a third optical axis from the target surface;

an image sensor with an array of photosensitive elements positioned to receive the scattered light from the target surface about the third optical axis at the array of photosensitive elements, the third optical axis being offset by a predefined angle from the second optical axis of the specularly reflected beam of light, the third optical axis being positioned at a nonzero angle with respect to the normal to the target surface, the image sensor being further positioned such that most or all of the specularly reflected beam of light does not strike the array of photosensitive elements, the image sensor being configured to produce frames of image data from the received scattered light;

collection optics positioned between the target surface and the image sensor to optically manipulate the scattered light about the third optical axis onto the array of photosensitive elements, the image sensor being positioned to receive the scattered light about the third optical axis from the collection optics at the array of photosensitive elements, where the third optical axis is offset by the predefined angle of five to twenty-five degrees from the second optical axis; and a processor operably connected to the image sensor to receive and correlate the frames of image data to estimate displacement with respect to the target surface when the target surface is a glass-like surface with small perturbations that produces the scattered light at angles near the third optical axis.

13. The system of claim 12 wherein the light source is positioned to emit the illumination beam of light along the first optical axis onto the target surface at the nonzero angle of incidence that is greater than thirty degrees.

14. The system of claim 12 further comprising illumination optics positioned between the target surface and the light source to receive the illumination beam of light from the light source and direct the illumination beam of light onto the target surface along the first optical axis.

15. The system of claim 14 wherein the light source is an incoherent light source and the illumination optics include a diffractive optical element to provide uniform illumination on the target surface with uniform radial angles.

16. The system of claim 12 wherein the array of photosensitive elements of the image sensor is positioned along the third optical axis.

17. The system of claim 12 wherein the collection optics includes an imaging lens configured to direct the scattered light about the third optical axis to the image sensor array and wherein the collection optics is configured to direct the specularly reflected beam of light away from the image sensor array.

18. The system of claim 12 further comprising multiple light sources positioned to emit illumination beams of light along different illumination optical axes onto the target surface so that scattered light from each of the illumination beams of light about the third optical axis is received at the image sensor array.

19. The system of claim 18 wherein the multiple light sources are positioned such that the illumination beams of light strike a common region on the target surface and such that optical axes of specularly reflected beams of light due to the illumination beams of light circumscribe the third optical axis.

20. The system of claim 12 wherein the light source is positioned to emit the illumination beam of light along the first optical axis onto the target surface at the nonzero angle of incidence of approximately thirty-six degrees and wherein the third optical axis is offset by the predefined angle of approximately fourteen degrees from the second optical axis.

21. A method for performing optical navigation, the method comprising:
    emitting an illumination beam of light along a first optical axis onto a target surface at a nonzero angle of incidence with respect to the normal to the target surface to produce a specularly reflected beam of light along a second optical axis from the target surface and to produce scattered light along a third optical axis from the target surface;
    receiving the scattered light from the target surface about the third optical axis at an image sensor array that is positioned such that most or all of the specularly reflected beam of light does not strike the image sensor array, the third optical axis being offset by a predefined angle from the second optical axis of the specularly reflected beam of light, the third optical axis being positioned at a nonzero angle with respect to the normal to the target surface and wherein the predefined angle is five to twenty-five degrees; and
    accumulating electrical signals at the image sensor array to produce frames of image data in response to the received scattered light to estimate displacement with respect to the target surface when the target surface is a glass-like surface with small perturbations that produces the scattered light at angles near the third optical axis.

22. The method of claim 21 wherein the nonzero angle of incidence is greater than thirty degrees.

23. The method of claim 21 further comprising optically manipulating the scattered light about the third optical axis onto the image sensor array and the specularly reflected beam of light away from the image sensor array.

24. The method of claim 21 further comprising emitting multiple illumination beams of light along different illumination optical axes onto a common region on the target surface so that scattered light from each of the illumination beams of light about the third optical axis is received at the image sensor array and so that optical axes of specularly reflected beams of light due to the illumination beams of light circumscribe the third optical axis.

25. The method of claim 21 wherein the emitting of the illumination beam of light includes emitting the illumination beam of light along the first optical axis onto the target surface at the nonzero angle of incidence of approximately thirty-six degrees with respect to the normal to the target surface and wherein the receiving of the scattered light from the target surface includes receiving the scattered light from the target surface about the third optical axis at the image sensor array, where the third optical axis is offset by the predefined angle of approximately fourteen degrees from the second optical axis.

* * * * *